(12) United States Patent
    Vuggrala et al.

(10) Patent No.: US 11,588,679 B2
(45) Date of Patent: Feb. 21, 2023

(54) SYSTEM AND METHOD OF ESTABLISHING SEAMLESS REMOTE ACCESS VIRTUAL PRIVATE NETWORK CONNECTIONS

(71) Applicant: HEWLETT PACKARD ENTERPRISE DEVELOPMENT LP, Houston, TX (US)

(72) Inventors: Shravan Kumar Vuggrala, Bangalore (IN); Raghunandan Prabhakar, Bangalore (IN)

(73) Assignee: Hewlett Packard Enterprise Development LP, Spring, TX (US)

(*) Notice: Subject to any disclaimer, the term of this patent is extended or adjusted under 35 U.S.C. 154(b) by 97 days.

(21) Appl. No.: 17/333,381

(22) Filed: May 28, 2021

(65) Prior Publication Data

US 2022/0321401 A1    Oct. 6, 2022

(30) Foreign Application Priority Data

Apr. 6, 2021 (IN) .............................. 202141016144

(51) Int. Cl.
    *H04L 41/0668*    (2022.01)
    *H04L 12/46*    (2006.01)
    *H04L 61/5007*    (2022.01)

(52) U.S. Cl.
    CPC ...... *H04L 41/0668* (2013.01); *H04L 12/4641* (2013.01); *H04L 61/5007* (2022.05)

(58) Field of Classification Search
    None
    See application file for complete search history.

(56) References Cited

U.S. PATENT DOCUMENTS

| | | | |
|---|---|---|---|
| 8,132,247 B2 | 3/2012 | Adhya et al. | |
| 8,209,749 B2 | 6/2012 | Park et al. | |
| 9,871,690 B2 | 1/2018 | Theogaraj et al. | |
| 10,257,167 B1 | 4/2019 | Matthews et al. | |
| 2018/0352036 A1* | 12/2018 | Baid | ...................... H04L 67/145 |
| 2019/0327113 A1* | 10/2019 | Kandasamy | .......... H04W 76/18 |
| 2019/0327147 A1* | 10/2019 | Killadi | ................ H04L 43/0811 |
| 2021/0112034 A1* | 4/2021 | Sundararajan | ........ H04L 47/726 |
| 2022/0247726 A1* | 8/2022 | Mooney | ................ H04L 9/0891 |

OTHER PUBLICATIONS

IBM, "Working with High Availability (HA) and VRRP," retrieved online Dec. 16, 2020, https://cloud.ibm.com/docs/virtual-router-appliance?topic=virtual-router-appliance-working-with-high-availability-and-vrrp.

* cited by examiner

*Primary Examiner* — Kenny S Lin
(74) *Attorney, Agent, or Firm* — Hewlett Packard Enterprise Patent Department

(57) ABSTRACT

A system and a method of establishing seamless remote access VPN connections are described. For establishment of a VPN connection for a user device, a cluster leader of a cluster of controllers identifies an active controller and a standby controller, based on network load of each controller of the cluster of controllers. An active VPN connection is established between the user device and the active controller and a standby VPN connection is established between the user device and the standby controller. The standby VPN connection is utilized in place of the active VPN connection during failover of the active controller. Because information of an active session is regularly shared by the active controller to the standby controller, the standby controller can seamlessly resume the active session during failover of the active controller.

20 Claims, 7 Drawing Sheets

SYSTEM AND METHOD OF ESTABLISHING SEAMLESS REMOTE ACCESS VIRTUAL PRIVATE NETWORK CONNECTIONS

BACKGROUND

Public networks, such as the internet, are widely used for exchange of information, for example mails, photos, and data files. However, the public networks are entrusted networks as the information exchanged over the public networks is visible to agencies such as the Internet Service Providers (ISPs) responsible for managing segments of the public networks or in entirety. To avoid compromising the information, Virtual Private Network (VPN) connections are used, especially by organizations, which are most concerned about privacy and safety of their information.

A VPN connection involves establishment of a point-to-point secure network communication link between two devices, also known as endpoints. Because the data exchanged over such communication link is encrypted, ISPs or other agencies don't have visibility of the data. Therefore, VPN connections are preferred in scenarios where maintaining data privacy and data security is an extreme priority. For such reasons, VPN connections are typically established for accessing resources or services of an organization.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles related to the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings.

DETAILED DESCRIPTION

Figure 1:
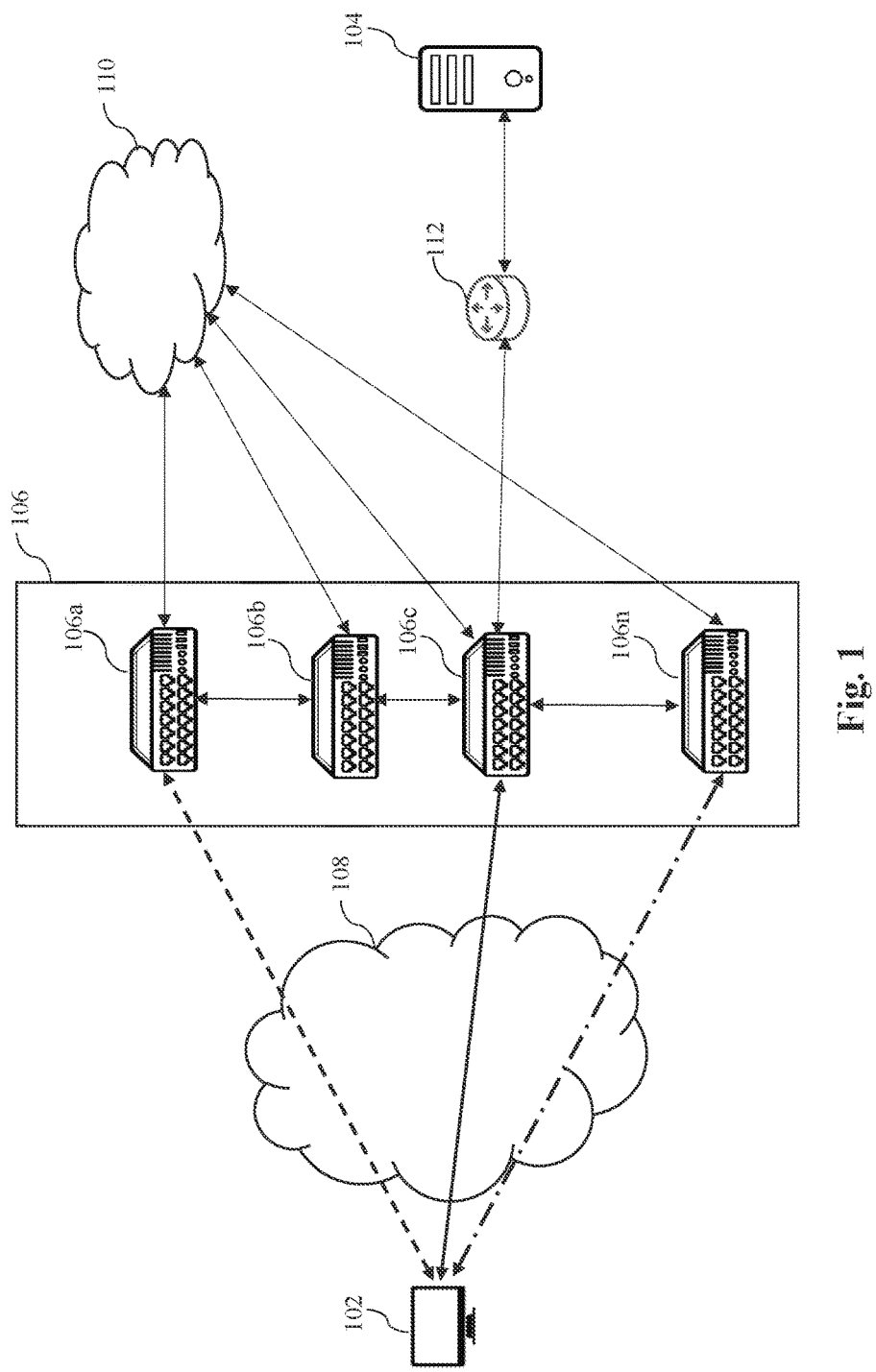
FIG. 1 illustrates network architecture of a system for establishing seamless remote access Virtual Private Network (VPN) connections, in accordance with an embodiment of the present disclosure.

Typically, for establishment of a Virtual Private Network (VPN) connection, a software program (e.g., a VPN client, etc.) loaded over user devices send communication requests to a VPN Concentrator (VPNC), using an Internet Protocol (IP) address of the VPNC. The IP address of the VPNC is pre-stored into the software program. In response to the communication requests, the VPNC forwards its IP address using which the user devices can establish a VPN connections. During such instance, unavailability of the VPNC is required to be determined so that the VPNC could be re-instated or another VPNC could be configured to re-establish the VPN connection with the user device. This causes interruption in the VPN connection established and thereupon managed by the VPNC.

In case a secondary VPNC is pre-configured to be utilized during unavailability of a primary VPNC, the secondary VPNC would be kept unutilized and brought to use only when the primary VPNC becomes unavailable. Because the primary VPNC would manage all the VPN connections for different users and the secondary VPNC would be required to initiate new VPN connections for the user when the primary VPNC becomes unavailable, entire network load remains on a single VPNC (either the primary VPNC or the secondary VPNC) at any point of time. Further, the secondary VPNC could manage new VPN connections for the user device only after determining that the primary VPNC is unavailable. A significant amount of time, for example 3-5 seconds, may be spent in determining unavailability of the primary VPNC. Therefore, a significant time delay would incur in determining unavailability of the primary VPNC, and thereupon managing such failure of VPN connection through configuration of the secondary VPNC. Also, because the VPN connections are required to be re-established by the secondary VPNC when the primary VPNC becomes unavailable, session information would also get lost. This would result in delivery of an interrupted VPN connection service to the users.

To address the above mentioned shortcomings, present disclosure proposes a system and method of establishing seamless remote access VPN connections. Along with several other technical features, the proposed system and method describes about retaining a VPN connection, preventing loss of session information, and balancing network load on VPNCs. Detailed implementation of such technical features is now provided in successive passages.

At first, a request for establishing a secure network connection i.e. a VPN connection with an internal server of an organization may be received from a user device. Such request may be provided to a cluster leader i.e. a VPNC responsible for managing a cluster of controllers (VPNCs). The cluster leader may store information of network load of each controller of the cluster of controllers. Using such information, the cluster leader may identify an active controller i.e. a controller having least network load from the cluster of controllers to process the request. Further, the cluster leader may also identify a first standby controller which could be used to manage the VPN connection during failure of the active controller. The active controller and the first standby controller may be identified such that even distribution of network load remains on each controller of the cluster of controllers. In this manner, the cluster leader storing the information of the network load in itself is able to quickly identify the active controller and the first standby controller. Further, with usage of the information of the network load, all the controllers could he utilized uniformly without putting the burden of managing all VPN connections on a single controller.

Identity details, such as IP address or Media Access Control (MAC) address, of the active controller may be transmitted to the user device. Using such identity details, the user device may establish an active VPN connection with the active controller. The active controller having connectivity with the internal server would enable communication between the user device and the internal server. Further, upon establishing the active VPN connection with the user device, the active controller may transmit identity details of the first standby controller to the user device. Using such identity details, the user device may establish a standby VPN connection with the first standby controller. The active controller may transmit state information with the first standby controller. Static state information, such as an inner IP address allocated to the user device may be transmitted to the first standby controller during establishment of the active VPN connection. Further, dynamic state information, such as session information, may be shared with the first standby controller at a predefined time interval.

All the controllers present in the cluster of controllers may share heartbeat packets, also known as keep alive packets, to indicate their functioning. Present disclosure proposes sharing of these keep alive packets after a very brief time interval, ranging between 1 millisecond to 1000 millisecond. By sharing the keep alive packets very frequently, inactivity/unavailability of any controller could be quickly determined. In one instance, when a predefined number of keep alive packets are not received from the active controller, the first standby controller may quickly determine (in a few milliseconds) inactivity of the active controller, and may update the user device about such inactivity of the active controller. Thereupon, the first standby controller may be configured as i.e. replace the active controller, thereby converting the standby VPN connection into the active VPN connection. Using the session information, the first standby controller may continue the active VPN connection which was previously managed by the active controller, without requiring termination of the active VPN connection and re-establishment of a new VPN connection. Further, during failure of the active controller and the first standby controller replacing the active controller, a requirement of electing a second standby controller for the user device, by the cluster leader, may arise. Once elected, identity details of the second standby controller may be communicated to the user device so that the second standby controller could be utilized for resuming the active VPN connection during future failure of the first standby controller i.e. the controller functioning as an active controller at that instant.

The detailed description set forth below in connection with the appended drawings is intended as a description of various embodiments of the present disclosure and is not intended to represent the only embodiments in which details of the present disclosure may be implemented. Each embodiment described in this disclosure is provided merely as an example or illustration, and should not necessarily be construed as preferred or advantageous over other embodiments.

FIG. 1 illustrates network architecture of a system for establishing seamless remote access Virtual Private Network (VPN) connections, in accordance with an embodiment of the present disclosure. A user device 102 may need to establish a secure network connection i.e. a VPN connection with an internal server 104 storing data of an organization. A VPN client i.e, a software service may be installed on the user device 102 for initiating and managing the VPN connection with the internal server 104. Although a single server is illustrated as the internal server 104 for ease of illustration, it must be understood that the internal server 104 may correspond to a group of servers present physically within premises of an organization, group of servers present at a remote location present outside premises of the organization, or a server configured over a network cloud.

A cluster of controllers 106 may be configured to establish and manage the VPN connection between the user device 102 and the internal server 104. The controllers present in the cluster of controllers 106 may correspond to VPN concentrators which operate on layer 3 i.e. network layer, using Internet Protocol (IP) address. The VPN concentrators would establish and thereupon manage an encrypted VPN tunnel, for providing secure data communication between the user device 102 and the internal server 104. The user device 102 may be connected to the cluster of controllers 106 through a public network 108, such as the internet, over which the VPN tunnel may be established.

The cluster of controllers 106 may include a master controller 106a acting as a single point of contact for the user device 102. The master controller 106a may be configured within the cluster of controllers 106 through a suitable protocol, such as Virtual Router Redundancy Protocol (VRRP). The cluster of controllers 106 may further include a cluster leader 106b. The cluster leader 106b may be elected using a suitable leader election technique. The cluster leader 106b may be configured to administer network load over remaining controllers present in the cluster of controllers i.e. controllers 106a through 106n and store information of the network load so that the information could be quickly accessed when needed. The network load may correspond to number of VPN connections managed by each controller. Information of such network load would help the cluster leader 106b in identifying a controller managing least number of VPN connections, and thus a new request for establishment of VPN connection may be assigned to such controller. In this manner, a single controller is not burdened to manage all VPN connections, but the VPN connections are equally assigned to and managed by each of the controllers 106a through 106n.

Based on the information of the network load, an active controller may be identified by the cluster leader 106b for establishing a VPN connection between the user device 102 and the internal server 104. A standby controller may also be identified by the cluster leader 106b for resuming the VPN connection between the user device 102 and the internal server 104 when the active controller is unreachable i.e. becomes inactive. For example, the controller 106c may be configured as the active controller for establishing the VPN connection between the user device 102 and the internal server 104, and the controller 106n may be assigned as the standby controller for resuming the VPN connection when the controller 106c goes down.

A network address management system 110, preferably a cloud based system, may be connected with the cluster of controllers 106. The network address management system 110 may be configured to provide a central network management service for allocation of inner IP address to the VPN client installed on the user device 102. The user device 102 may be identified by the cluster of controllers 106 and the internal server 104 through such inner IP address. Further, as illustrated in FIG. 1, one or more networking devices, such as a router 112 may provide connectivity between the cluster of controllers 106 and the internal server 104. Routing table of the router 112 may be updated to store inner IP address and network routes corresponding to the user device 102.

Figure 2:
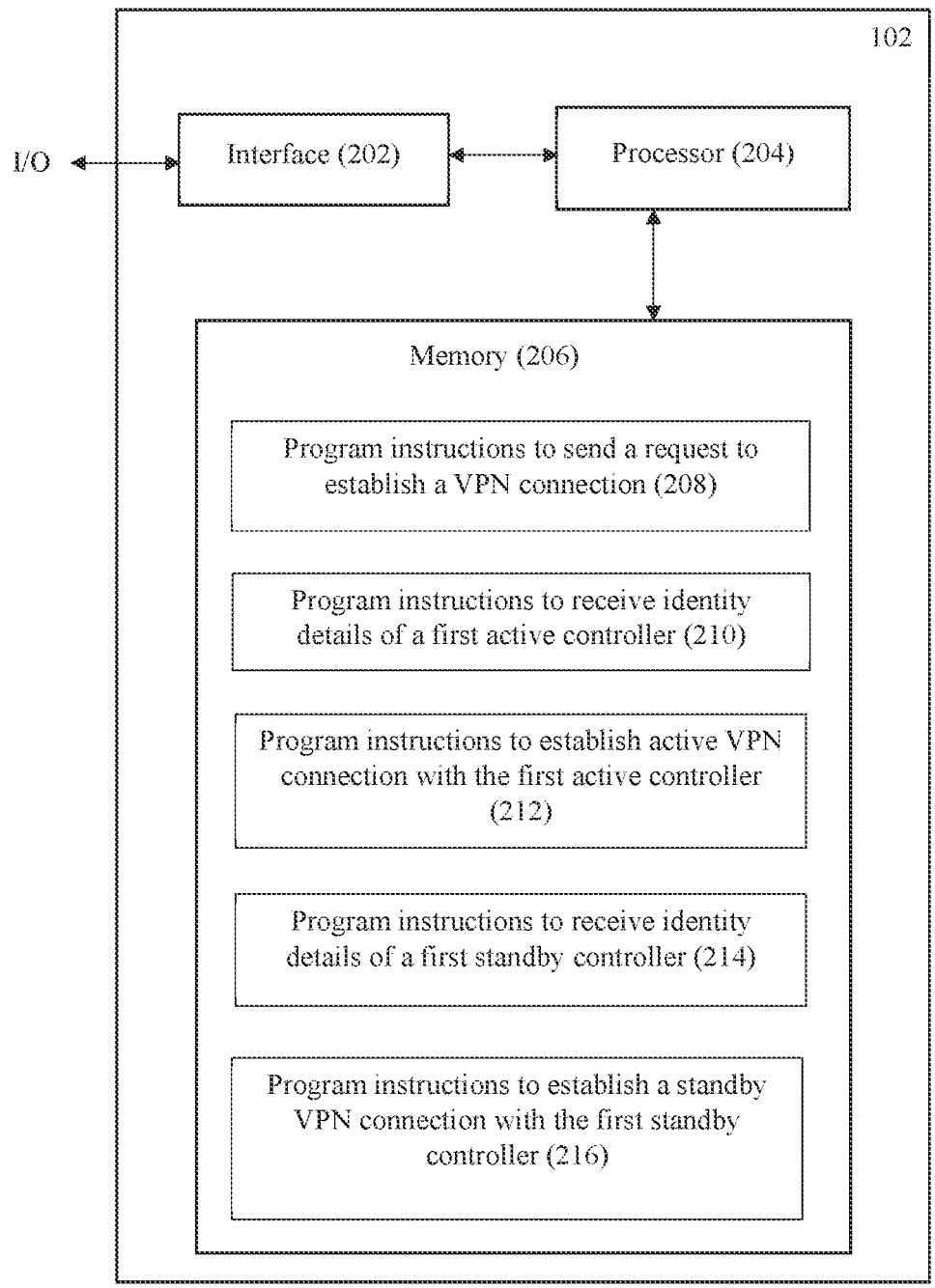
FIG. 2 illustrates a block diagram showing different components of a user device requesting establishment of a VPN connection, in accordance with an embodiment of the present disclosure.

FIG. 2 illustrates a block diagram showing different components of the user device 102, in accordance with an embodiment of the present disclosure. The user device 102 may comprise an interface 202, a processor 204, and memory 206. The memory 206 may store program instructions executable by the processor 204 for establishing a VPN connection with the internal server 104. A few such program instructions stored in the memory 206 includes program instructions to send a request to establish a secure network connection i.e. VPN connection 208, program instructions to receive identity details of an active controller 210, program instructions to establish an active VPN connection with the active controller 212, program instructions to receive identity details of a first standby controller 214, and program instructions to establish a standby VPN connection with the first standby controller 216.

The program instructions to send a request to establish a secure network connection i.e. VPN connection 208 may result in transmission of a VPN connection request to a master controller whose Internet Protocol (IP) address may be stored in a VPN client installed over the user device 102. The program instructions to receive identity details of an active controller 210 and the program instructions to establish an active VPN connection with the active controller 212 may result into receipt of identity details, such as IP address, of the active controller, and establishment of an active VPN connection with the active controller. The program instructions to receive identity details of a first standby controller 214 and the program instructions to establish standby VPN connection with the first standby controller 216 may result into receipt of identity details, such as IP address, of the first standby controller, and establishment of a standby VPN connection with the first standby controller. Such standby VPN connection may be utilized while the active VPN controller goes down. Detailed functioning of the programmed instructions is provided in successive paragraphs.

Figure 3:
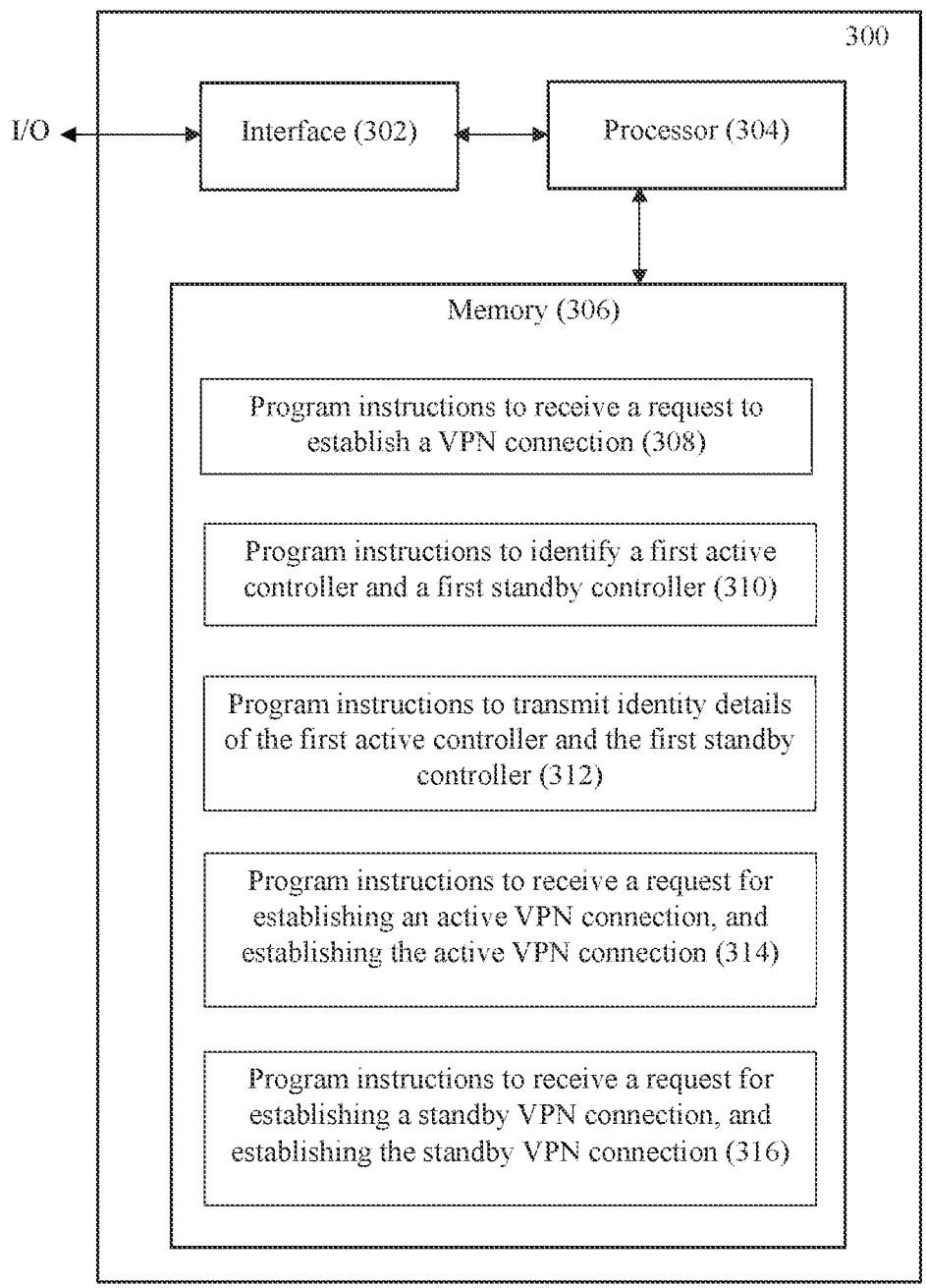
FIG. 3 illustrates a block diagram showing different components of a controller responsible for establishing a VPN connection for the user device, in accordance with an embodiment of the present disclosure.

FIG. 3 illustrates a block diagram showing different components of a controller 300 responsible for establishing a VPN connection between the user device 102 and the internal server 104, in accordance with an embodiment of the present disclosure. Although all the controllers present in the cluster of controllers 106 may have a similar hardware capabilities, the controller 300 may be understood as the cluster leader 106b. Henceforth, the controller 300 would be referred as the cluster leader 106b. The cluster leader 106b may comprise an interface 302, a processor 304, and a memory 306. The memory 306 may store program instructions executable by the processor 304 for establishing a VPN connection between the user device 102 and the internal server 104. A few such program instructions stored in the memory 306 includes program instructions to receive a request to establish a VPN connection 308, program instructions to identify an active controller and a first standby controller 310, program instructions to transmit identity details of the active controller and the first standby controller 312, program instructions to receive a request for establishing an active VPN connection, and establishing the active VPN connection 314, and program instructions to receive a request for establishing a standby VPN connection, and establishing the standby VPN connection 316.

The program instructions to receive a request to establish a VPN connection 308 may cause receipt of a VPN connection request from a VPN client installed over the user device 102. The VPN connection request may be received through a master controller. The program instructions to identify an active controller and a first standby controller 310 may cause identification of the active controller and the first standby controller from the cluster of controllers 106 based on network load present on each controller. The program instructions to transmit identity details of the active controller and the first standby controller 312 may cause transmission of identity details, such as IP address, of the active controller and the first standby controller to the user device 102. The program instructions to receive a request for establishing an active VPN connection, and establishing the active VPN connection 314 may result in establishment of the active VPN connection between the user device 102 and the active controller 106c. The program instructions to receive a request for establishing a standby VPN connection, and establishing the standby VPN connection 316 may result in establishment of the standby VPN connection between the user device 102 and the first standby controller 106n.

Figure 4:
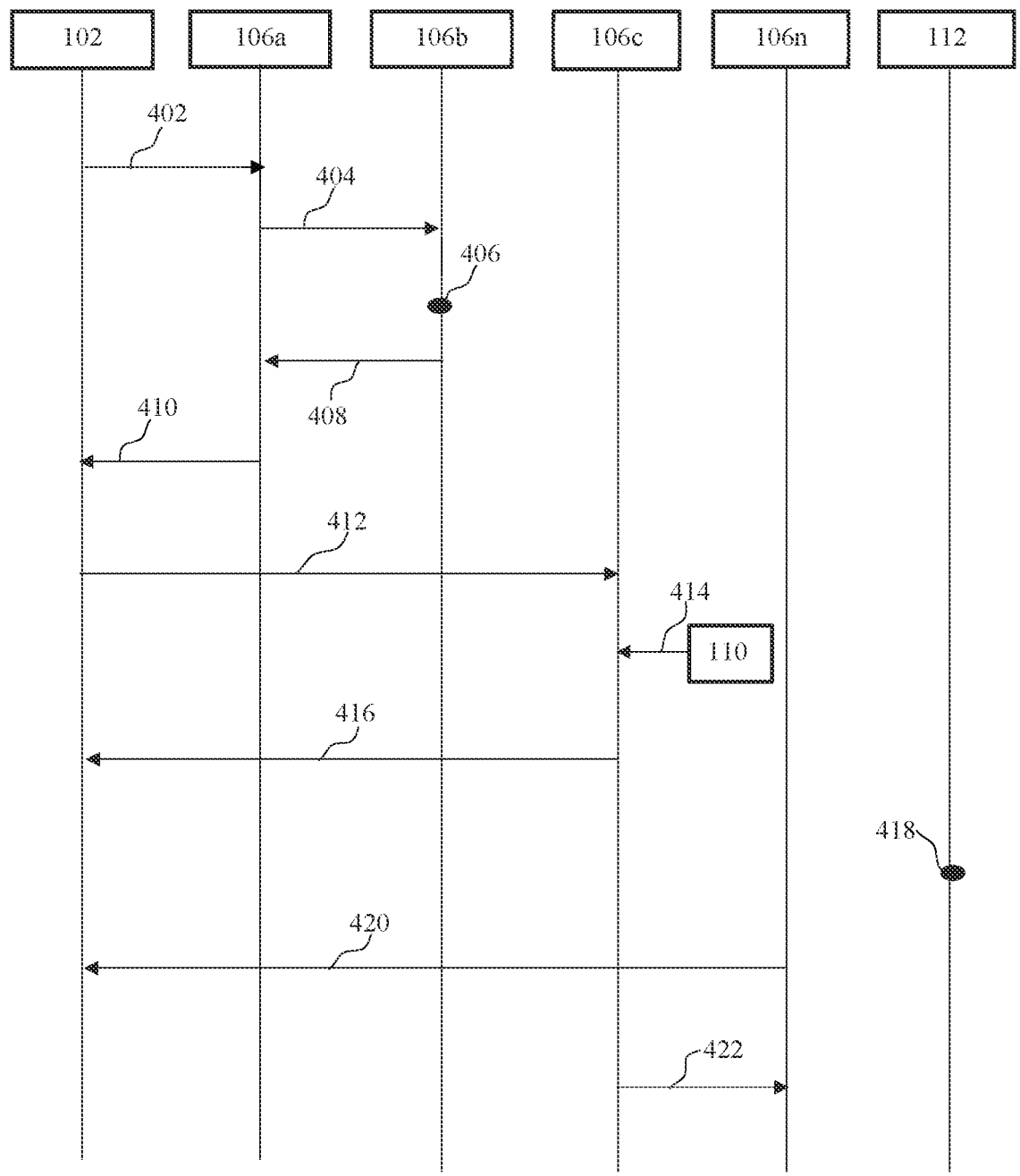
FIG. 4 illustrates a data flow diagram showing information exchange between a user device and cluster of controllers for establishment of a VPN connection, in accordance with an embodiment of the present disclosure.

FIG. 4 illustrates a data flow diagram showing information exchange between the user device 102 and the cluster of controllers 106 for establishing a VPN connection with the internal server 104, in accordance with an embodiment of the present disclosure.

Firstly, at instance 402, a VPN client installed on the user device 102 may initiate a request to establish a secure network connection i.e. a Virtual Private Network (VPN) connection with the internal server 104. Because VPN clients are generally configured to store Internet Protocol (IP) address of master controllers, such as a master configured to manage Virtual Router Redundancy Protocol (VRRP), the VPN client installed on the user device 102 would send the request to establish the VPN connection to the master controller 106a. Such master controller 106a acts as default gateway for the VPN client configured on the user device 102. Henceforth, wherever it is mentioned that the user device 102 transmits or receives an information, it must be understood that such communications are managed by the VPN client. At instance 404, the master controller 106a may forward the request to the cluster leader 106b. The cluster leader 106b may be a controller having highest computing capability amongst all the controllers. Upon receiving the request from the master controller, the cluster leader 106b may identify an active controller amongst several controllers present in the cluster of controllers 106, at instance 406. The active controller may be identified based on network load over each controller of the cluster of controllers 106, to maintain even distribution of network load i.e. load balancing over each controller of the cluster of controllers 106. Specifically, the controller managing least number of VPN connections may be identified as the active controller. In one implementation, the controller 106c may be selected as the active controller (henceforth referred as the active controller 106c). For example, when the controllers 106b and 106n are managing 5 VPN sessions each, and controller 106c is managing 4 VPN sessions, the controller 106c may be selected as an active controller for establishing VPN connection for the user device 102. In this manner, a single controller is not burdened to manage all VPN connections, but entire network load is equally distributed on multiple controllers. It must be noted that the cluster leader 106b which is one controller amongst the cluster of controllers 106 and not an external element stores information of the network load over each controller of the cluster of controllers 106, and performs the load balancing over the cluster of controllers 106 while establishing new VPN connections. Storage of the information of the network load at the cluster leader would enable the cluster leader to quickly identify the active controller and the first standby controller, and thus assist in quick establishment of a VPN connection. Further, in any instance, if the cluster leader 106b goes down, the information of the network load of the controllers present in the cluster of controllers 106 would be rebuilt 1w another controller amongst the cluster of controllers 106 which gets elected as a new cluster leader.

Post identification, identity details of the active controller 106c may be transmitted to the user device 102. The identity details may include IP address, MAC address, or any other unique identifier corresponding to the active controller 106c. In one implementation, the identity details of the active controller 106c may first be transmitted to the master controller 106a, at instance 408. Successively, the master controller 106a may forward the identity details of the active controller 106c to the user device 102, at instance 410. In one implementation, the master controller 106a may forward the identity details of the active controller 106c to the user device 102 in form of a redirect message.

Upon knowing the identity details of the active controller 106c, the user device 102 may forward the request to establish the VPN connection to the active controller 106c, at instance 412. Upon receiving such request, the active controller 106c would request the network address management system 110 to allocate an inner IP address for the user device 102 and may obtain the inner IP address, at instance 414. The inner IP address may correspond to a private IP address and may be allocated from a pool of private IP addresses available with the network address management system 110 for allocation. The active controller 106c may forward the inner IP address to the user device 102 and may establish an active VPN connection with the user device 102, at instance 416. The active VPN connection may be established using secure protocols, such as Internet Key Exchange (IKE), Internet Protocol Security (IPSec), Generic Routing Encapsulation (GRE), Secure Socket Tunneling Protocol (SSTP), and others.

Successively, the active controller 106c may update other controllers present in the cluster of controllers 106 about the inner IP address allocated to the user device 102 and other relevant details associated with the active VPN connection managed by the active controller 106c for the user device 102. The active VPN connection initiated at the user device 102 on one end may be completed at the internal server 104 on the other end. For the user device 102, the active controller 106c may provide VPN connectivity via the router 112. When the router 112 receives the request for completing the active VPN connection between the user device 102 and the internal server 104, the router 112 may update its routing table to store the inner IP assigned to the user device 102 and routing details corresponding to such active VPN connection, at instance 418.

At instance 416, when the active controller 106c establishes the active VPN connection with the user device 102, the active controller 106c may also share identity details of a standby controller with the user device 102. The standby controller may be identified by the cluster leader 106b from the several controllers present in the cluster of controllers 106. The standby controller may be identified based on network load over each controller of the cluster of controllers 106, to maintain even distribution of network load i.e. load balancing over each controller of the cluster of controllers 106. In one implementation, the controller 106n may be selected as a first standby controller (henceforth referred as the first standby controller 106n). In different implementations, the first standby controller 106n may be identified during or immediately after identification of the active controller 106c.

Post identification, identity details of the first standby controller 106n may be transmitted to the user device 102 and a standby VPN connection may be established between the user device 102 and the first standby controller 106n, at instance 420. The identity details of the first standby controller 106n may be transmitted to the user device 102 in form of a control message, such as a node list message. Upon establishment of the active VPN connection and the standby VPN connection, the active controller 106c may communicate state information with the first standby controller 106n, at instance 422. The state information may include static state information, such as the inner IP address allocated to the user device 102. Because the static state information does not change over time, it may be shared once, for example during establishment of the active VPN connection. The state information may further include dynamic state information, such as information related to session data i.e. data exchanged through the active VPN connection. Because the dynamic state information changes frequently over time, it may be shared at a predefined time interval. In one implementation, the predefined time interval for sharing the dynamic state information may be set in the order of milliseconds or seconds, for example 5 seconds.

Figure 5:
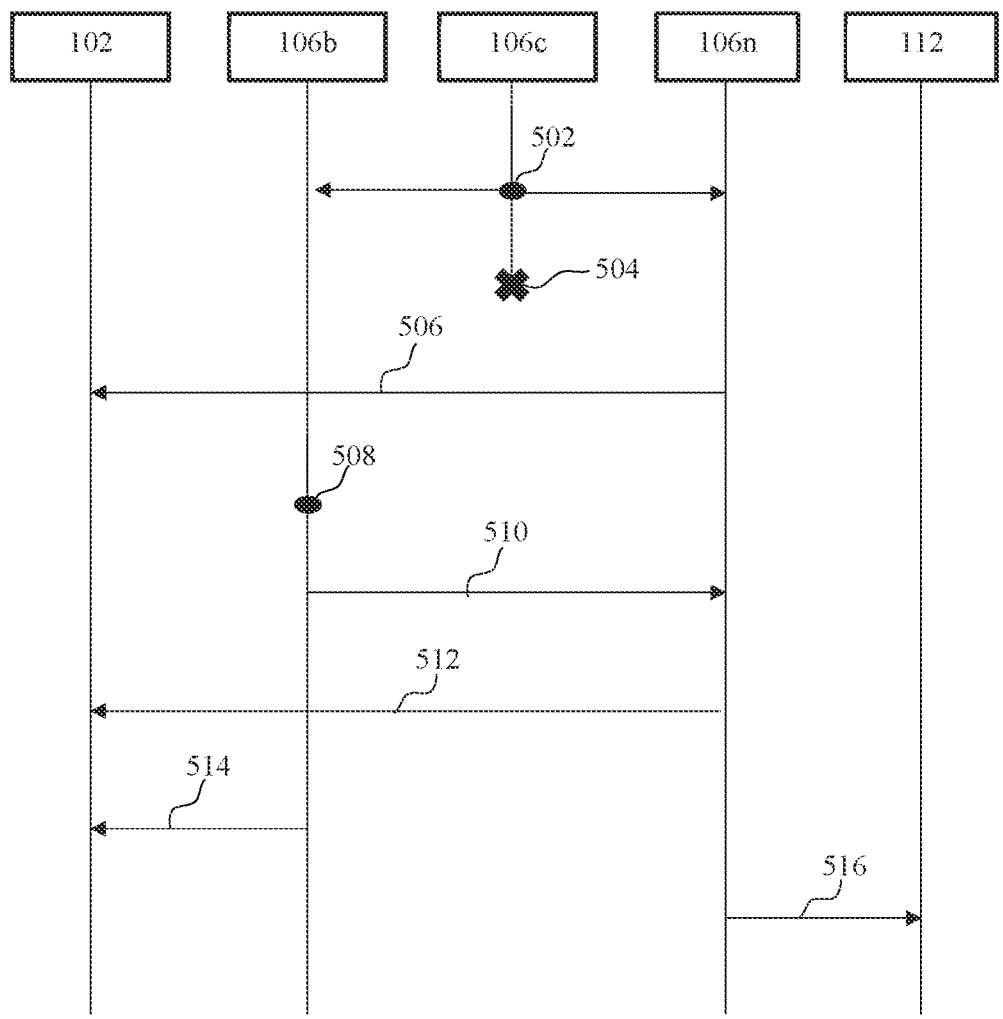
FIG. 5 illustrates a data flow diagram showing information exchange between a user device and cluster of controllers during failover of an active controller, in accordance with an embodiment of the present disclosure.

FIG. 5 illustrates a data flow diagram showing information exchange between the user device 102 and the cluster of controllers 106 during failover of the active controller 106c, in accordance with an embodiment of the present disclosure. All the controllers present in the cluster of controllers 106 exchange test packets, generally known as keep alive packets or heartbeat packets, to indicate their functioning. Such keep alive packets are shared by a transmitting controller as unicast messages to intended receivers. The intended receivers include all the controllers (excluding the transmitting controller) present in the cluster of controllers 106. Particularly, all the controllers share such keep alive packets with the cluster leader 106b so that the cluster leader 106b is continuously aware of the controllers that are up and functioning and the controllers that have stopped functioning. To enable the cluster leader 106b to quickly determine about inactivity of a particular controller and successively deploy redundancy configurations for managing a VPN connection, frequency of sharing the keep alive packets is deliberately kept high. The keep alive packets can be shared at a predefined time interval ranging from 1 millisecond to 1000 millisecond. In one preferred implementation, the keep alive packets may be shared after every 100 milliseconds i.e. 0.1 second.

In one implementation, the active controller 106c may continuously transmit, at predefined time intervals, the keep alive packets to the cluster leader 106b and the first standby controller 106n, as illustrated at instance 502. Thereupon, at instance 504, the active controller 106c may become unreachable i.e. become inactive, and thus stop transmitting the keep alive packets. When the cluster leader 106b and the first standby controller 106n fail to receive a predefined number of keep alive packets from the active controller 106c, for example 3 keep alive packets, the cluster leader 106b and the first standby controller 106n may determine that the active controller 106c is unreachable.

At instance 506, the first standby controller 106n may communicate to the user device 102 that the active controller 106c has become unreachable. In one implementation, such information may be transmitted to the user device 102 in form of a failover message. Thereupon, the cluster leader 106b may identify a second standby controller from the cluster of controllers 106, at instance 508. In one scenario, the cluster leader 106b may identify itself as the second standby controller. Henceforth, the cluster leader 106b may be alternatively referred as the second standby controller 106b wherever required. The cluster leader 106b may communicate details about its election as the second standby controller 106*b*, to the first standby controller 106*n*, at instance 510.

Successively, at instance 512, the first standby controller 106*n* may replace the active controller 106*c* and may itself become the active controller 106*n*. With this, the active controller 106*n* may resume the active VPN connection with the user device 102, using last received state information. With the first standby controller 106*n* becoming the active controller 106*c*, the standby VPN connection gets converted into (is utilized as) the active VPN connection. At instance 512, the active controller 106*n* may also update the user device 102 with details of the second standby controller 106*b*. In one implementation, identity details of the second standby controller 106*b* may be communicated with the user device 102 through the failover message itself. At instance 514, the second standby controller 106*b* may establish a standby VPN connection with the user device 102. Such standby VPN connection may be utilized during failure of the active VPN connection managed by the active controller 106*n*. At instance 516, updated route details may be sent to the router 112 so that the router can update its routing table to indicate that the active VPN connection with user device 102 is now managed through the active controller 106*n*.

In the above described manner, present disclosure enables immediate utilization of a standby VPN controller during failure of an active VPN controller. The standby VPN controller resumes a VPN connection already established by the active VPN controller, before becoming unreachable, over the standby VPN connection. The standby VPN connection is utilized immediately because state information is continuously shared at frequent intervals from the active VPN controller to the standby VPN controller. The state information received by the standby VPN controller enables it to resume the VPN connection, without requiring termination and re-establishment of the active VPN connection.

In the above described manner, present disclosure provides a method of quickly determining unavailability of an active VPN controller, instantaneously utilizing a standby VPN connection for resuming an active VPN connection using state information, and maintaining even distribution of network load (load balancing) on all controllers configured in a cluster of controllers.

Figure 6A:
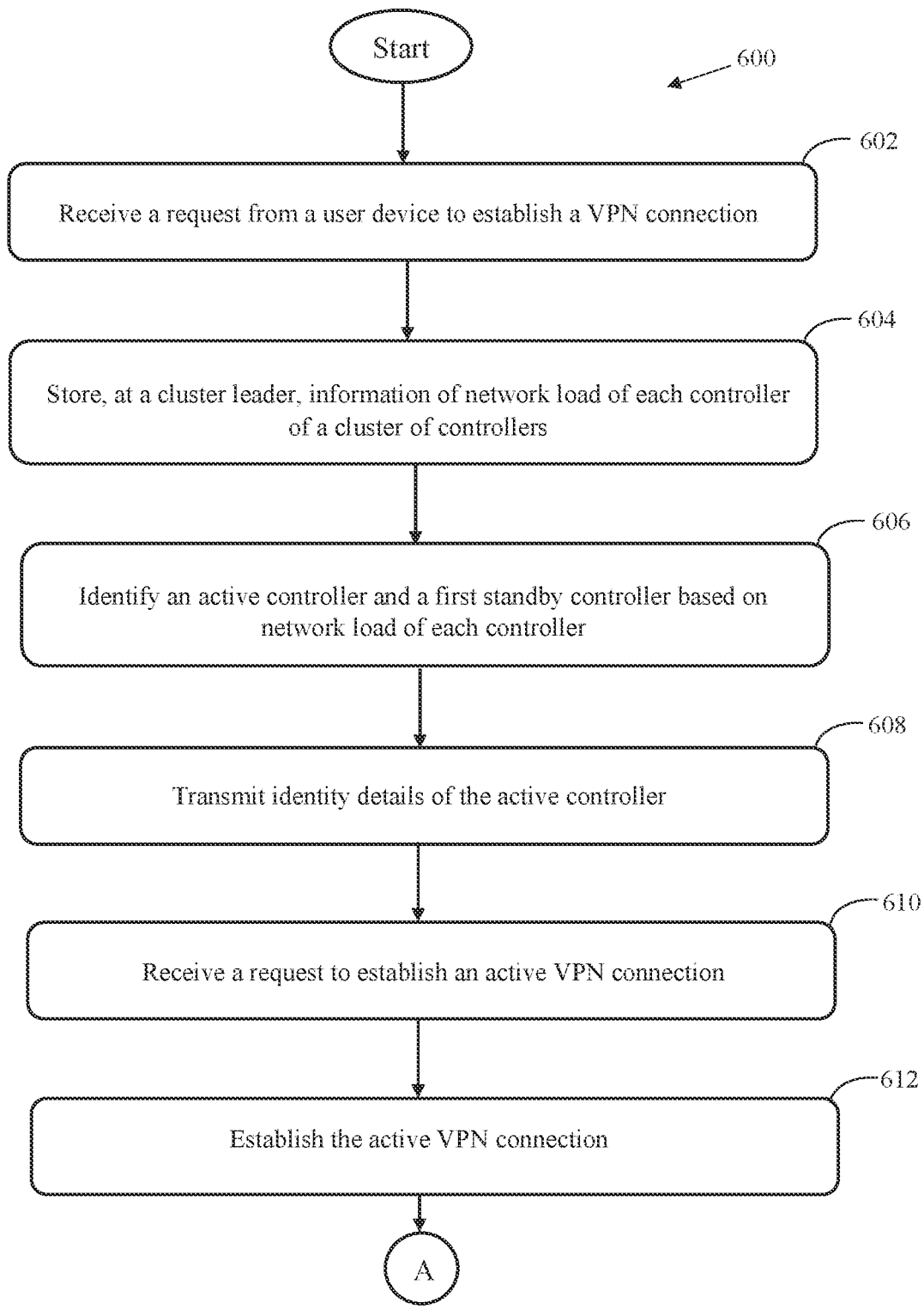
FIGS. 6A and 6B cumulatively illustrate a flowchart showing a method of establishing seamless remote access VPN connections, in accordance with an embodiment of the present disclosure.
Figure 6B:
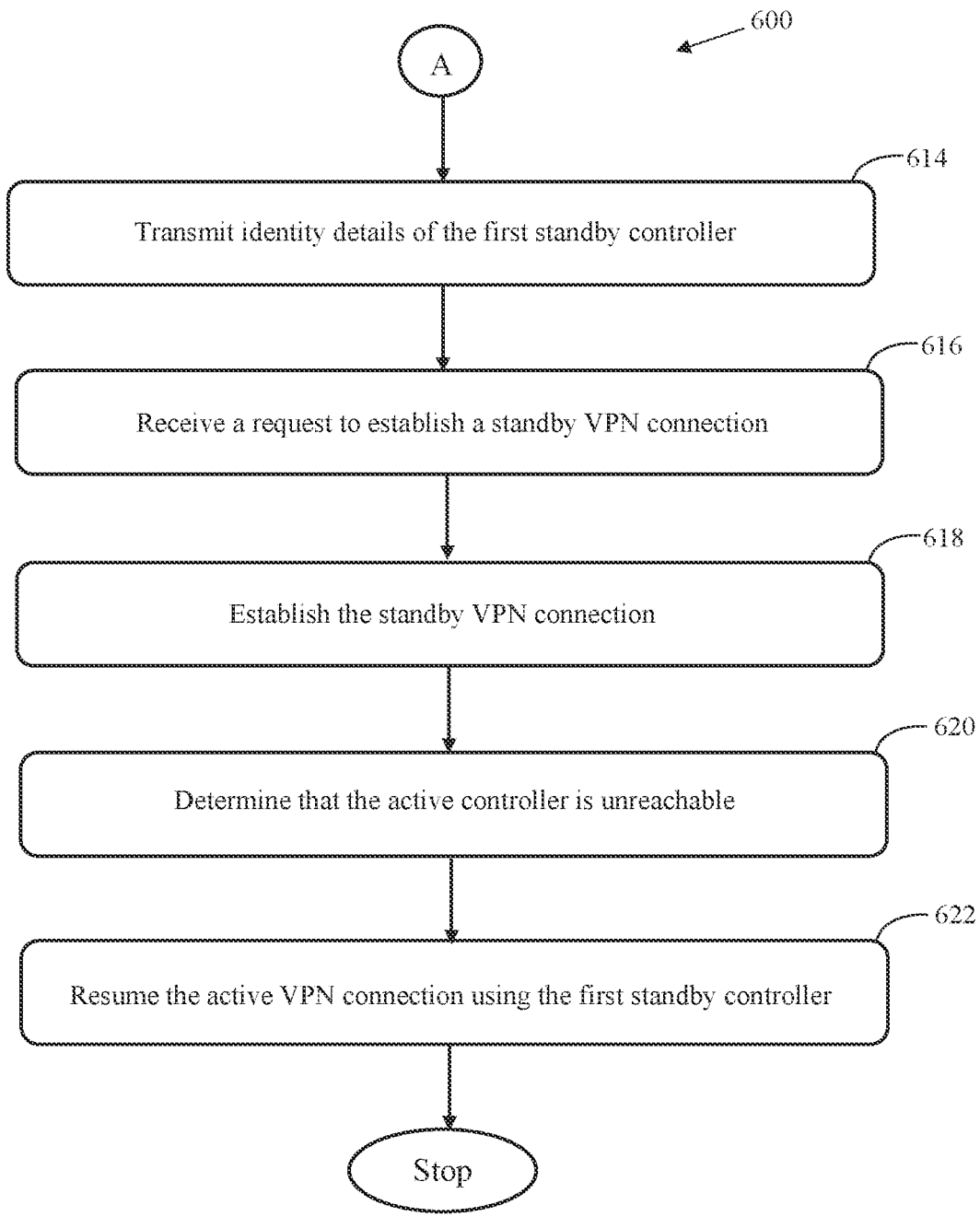

Cumulatively referring now to FIGS. 6A and 6B, a method of establishing seamless remote access Virtual Private Network (VPN) connections is described with reference to flowchart 600. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 6 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At block 602, a cluster leader of a cluster of controllers may receive a request to establish a secure network connection i.e. Virtual Private Network (VPN) connection from a user device. The cluster leader may receive the request through a master controller configured on the cluster of controllers using a suitable technique or protocol, for example Virtual Router Redundancy Protocol (VRRP). The user device may require to establish the VPN connection with an internal server of an organization for accessing stored data or an application configured on the internal server.

At block 604, information of network load of each controller of a cluster of controllers may be stores at the cluster leader. The network load may correspond to number of VPN connections managed by each controller of the cluster of controllers.

At block 606, the cluster leader may identify an active controller and a first standby controller from the cluster of controllers. The cluster leader may identify the active controller and the first standby controller based on network load of each controller of the cluster of controllers i.e. the active controller and the first standby controller are identified such that even distribution of network load remains on each controller of the cluster of controllers.

At block 608, a controller amongst the cluster of controllers may transmit identity details of the active controller to the user device for establishing an active VPN connection. In one implementation, the identity details, for example Internet Protocol (IP) address, of the active controller may be transmitted to the user device by the master controller.

At block 610, the active controller may receive a request from the user device to establish the active VPN connection for information exchange.

At block 612, in response to the request received from the user device, the active controller may establish the active VPN connection with the user device.

At block 614, the user device may share identity details of the first standby controller for establishing a standby VPN connection with the user device.

At block 616, the first standby controller may receive a request from the user device for establishing the standby VPN connection.

At block 618, the first standby controller establishes the standby VPN connection with the user device.

At block 620, it is determined that the active controller is unreachable/inactive.

At block 622, the first standby controller may resume the active VPN connection previously established by the active controller. The first standby controller may resume the active VPN connection using state information related to the VPN connection which may be frequently shared by the active controller with the first standby controller.

An embodiment of the disclosure may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hard-wired circuit components.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set as claimed in claims that issue from this application, in the specific form in which such claims issue, including any subsequent correction.

A virtual private network may be implemented using wired and/or wireless communication technologies. The virtual private network may comprise various network components such as switches, Provide Edge (PE) routers, Customer Edge (CE) routers, intermediate routers, bridges, computers, servers, and the like. The network devices present in the virtual private network may implement Virtual Router Redundancy Protocol (VRRP), Hot Standby Router Protocol (HSRP), IP security (IPSec), Internet Key exchange (IKE) version 1 or version 2, Virtual Extensible Local Area Network (VXLAN), Secure Shell (SSH) tunneling, Hyper Text Transfer Protocol (HTTP) tunneling, Internet Configuration Management Protocol (ICMP) tunneling, General Packet Radio Service (GPRS) Tunneling Protocol (GTP), Multiprotocol Label Switching (MPLS) tunneling, and other related protocols.

An interface may be used to provide input or fetch output from the system. The interface may be implemented as a Command Line Interface (CLI), Graphical User Interface (GUI). Further, Application Programming Interfaces (APIs) may also be used for remotely interacting with the system.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a digital signal processor, an application specific integrated circuit, a microcontroller, a state machine, or any type of programmable logic array.

A memory may include, but is no limited to, non-transitory machine-readable storage devices such as hard drives, magnetic tape, floppy diskettes, optical disks, Compact Disc Read-Only Memories (CD-ROMs), and magneto-optical disks, semiconductor memories, such as ROMs, Random Access Memories (RAMs), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive.

We claim:

1. A method comprising:
    receiving, by a cluster leader present amongst a cluster of controllers, a request from a user device to establish a Virtual Private Network (VPN) connection;
    storing, at the cluster leader, information of network load of each controller of the cluster of controllers, wherein the network load corresponds to number of active VPN connections managed by each controller of the cluster of controllers;
    identifying, by the cluster leader, an active controller and a first standby controller from the cluster of controllers based on the information of the network load of each controller of the cluster of controllers, wherein the active controller and the first standby controller are identified such that even distribution of network load remains on each controller of the cluster of controllers;
    transmitting, by one controller amongst the cluster of controllers, identity details of the active controller to a user device for establishing an active VPN connection with the active controller;
    receiving, by the active controller, a request from the user device for establishing the active VPN connection for information exchange;
    establishing, by the active controller, the active VPN connection with the user device and utilizing the active VPN connection for the information exchange;
    transmitting, by the active controller, identity details of the first standby controller to the user device for establishing a standby VPN connection;
    receiving, by the first standby controller, a request for establishing the standby VPN connection with the user device;
    establishing, by the first standby controller, the standby VPN connection with the user device;
    determining, by at least one of the cluster leader and the first standby controller, that the active controller is unreachable; and
    resuming, by the first standby controller, the active VPN connection for the information exchange.

2. The method as claimed in claim 1, wherein the cluster leader receives the request to establish the VPN connection through a controller configured as a Virtual Router Redundancy Protocol (VRRP) master within the cluster of controllers.

3. The method as claimed in claim 2, wherein the identity details of the active controller for establishing the active VPN connection is transmitted to the user device by the VRRP master.

4. The method as claimed in claim 1, further comprising transmitting static state information during establishment of the VPN connection, wherein the static state information includes an inner Internet Protocol (IP) address allocated to the user device.

5. The method as claimed in claim 1, further comprising transmitting dynamic state information at a predefined time interval, wherein the dynamic state information includes session data.

6. The method as claimed in claim 1, wherein at least one of the first standby controller and the cluster leader determines that the active controller is unreachable when a predefined number of keep alive packets are not received from the active controller.

7. The method as claimed in claim 6, wherein upon determining that the active controller is unreachable, the first standby controller performs:
    sending a failover message to the user device to indicate that the active controller is unreachable;
    converting the standby VPN connection into the active VPN connection using the state information, wherein with conversion of the standby VPN connection into the active VPN connection, the first standby controller is configured as the active controller; and
    transmitting identity details of a second standby controller, identified by the cluster leader from the cluster of controllers, to the user device.

8. The method as claimed in claim 1, further comprising transmitting, by the active controller, a unique identifier to the user device and each controller of the cluster of controllers, wherein the unique identifier is transmitted while establishing the active VPN connection with the user device and is used for communicating with a VPN client configured on the user device.

9. The method as claimed in claim 8, wherein the unique identifier is an inner IP address assigned by a central network management service.

10. A system comprising:
a cluster leader configured to:
receive a request from a user device to establish a Virtual Private Network (VPN) connection;
identify an active controller and a first standby controller from a cluster of controllers; and
transmit identity details of the active controller to the user device for establishing an active VPN connection with the active controller;
wherein the active controller is configured to:
receive a request from the user device for establishing the active VPN connection for information exchange;
establish the active VPN connection with the user device for the information exchange;
transmit identity details of the first standby controller to the user device for establishing a standby VPN connection; and
transmit state information related to the active VPN connection to the first standby controller; and
wherein the first standby controller is configured to:
receive a request for establishing the standby VPN connection with the user device;
establish the standby VPN connection with the user device;
determine that the active controller is unreachable when a predefined number of keep alive packets are not received from the active controller; and
resume the active VPN connection using the state information, for the information exchange.

11. The system as claimed in claim 10, wherein the cluster leader receives the request to establish the VPN connection through a controller configured as a Virtual Router Redundancy Protocol (VRRP) master within the cluster of controllers.

12. The system as claimed in claim 11, wherein the identity details of the active controller for establishing the active VPN connection and the identity details of the first standby controller for establishing the standby VPN connection are transmitted to the user device by the VRRP master.

13. The system as claimed in claim 10, wherein the state information includes static state information which is transmitted during establishment of the standby VPN connection, and wherein the static state information includes an inner Internet Protocol (IP) address allocated to the user device.

14. The system as claimed in claim 10, wherein the state information includes dynamic state information which is transmitted at a predefined time interval, and wherein the dynamic state information includes session data.

15. The system as claimed in claim 10, wherein the active controller transmits a unique identifier to the user device and each controller of the cluster of controllers, and wherein the unique identifier is transmitted while establishing the active VPN connection with the user device and is used for communicating with a VPN client configured on the user device.

16. The system as claimed in claim 10, wherein upon determining that the active controller is unreachable, the first standby controller:
sends a failover message to the user device to indicate that the active controller is unreachable;
converts the standby VPN connection into the active PN connection using the state information, wherein with conversion of the standby VPN connection into the active VPN connection, the first standby controller is configured as the active controller; and
transmits identity details of a second standby controller, identified by the cluster leader from the cluster of controllers, to the user device.

17. The system as claimed in claim 16, wherein the identify details include a public 11D address of a corresponding controller of the cluster of controllers.

18. The system as claimed in claim 10, wherein keep alive packets are shared at a predefined time interval ranging from 1 millisecond to 1000 millisecond.

19. The system as claimed in claim 10, wherein the active controller and the first standby controller are identified from the cluster of controllers based on information of network load of each controller of the cluster of controllers stored at the cluster leader, wherein the active controller and the first standby controller are identified such that even distribution of network load remains on each controller of the cluster of controllers, and wherein the network load over each controller corresponds to number of active VPN connections managed by each controller.

20. A non-transitory machine-readable storage medium that stores instructions which, when executed by a processor, perform a plurality of operations comprising:
receiving, by a cluster leader present amongst a cluster of controllers, a request from a user device to establish a Virtual Private Network (VPN) connection;
storing, at the cluster leader, information of network load of each controller of the cluster of controllers, wherein the network load corresponds to number of active VPN connections managed by each controller of the cluster of controllers;
identifying, by the cluster leader, an active controller and a first standby controller from the cluster of controllers, based on the information of the network load of each controller of the cluster of controllers, wherein the active controller and the first standby controller are identified such that even distribution of network load remains on each controller of the cluster of controllers;
transmitting, by one controller amongst the cluster of controllers, identity details of the active controller to a user device for establishing an active VPN connection with the active controller;
receiving, by the active controller, a request from the user device for establishing the active VPN connection for information exchange;
establishing, by the active controller, the active VPN connection with the user device and utilizing the active VPN connection for the information exchange;
transmitting, by the active controller, identity details of the first standby controller to the user device for establishing a standby VPN connection;
receiving, by the first standby controller, a request for establishing the standby VPN connection with the user device;
establishing, by the first standby controller, the standby VPN connection with the user device;

determining, by at least one of the cluster leader and the first standby controller, that the active controller is unreachable; and resuming, by the first standby controller, the active VPN connection for the information exchange.

\* \* \* \* \*